A. D. GRAHAM.
BUTTERIN MIXER.
APPLICATION FILED AUG. 11, 1913.
1,098,622.
Patented June 2, 1914.
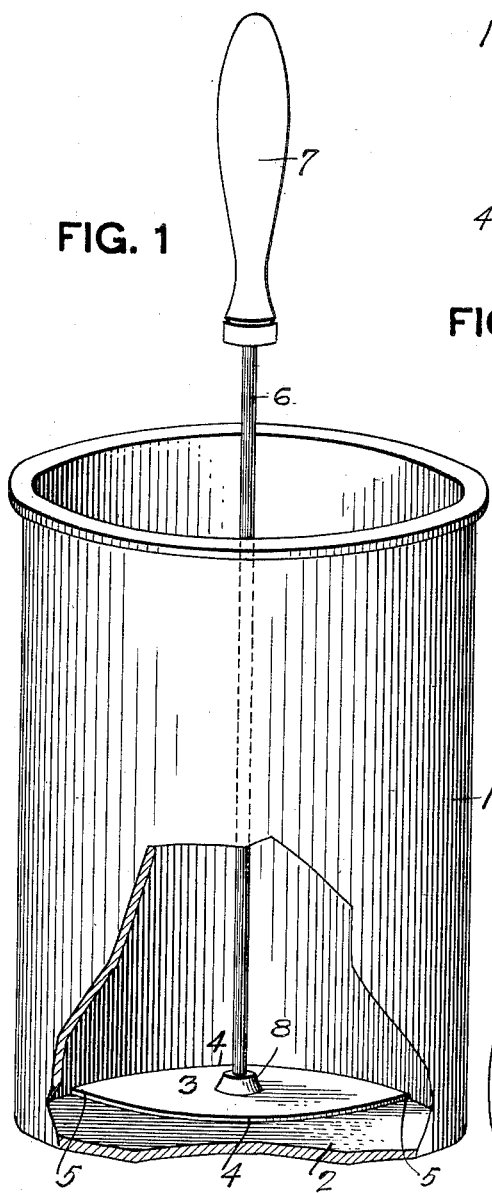
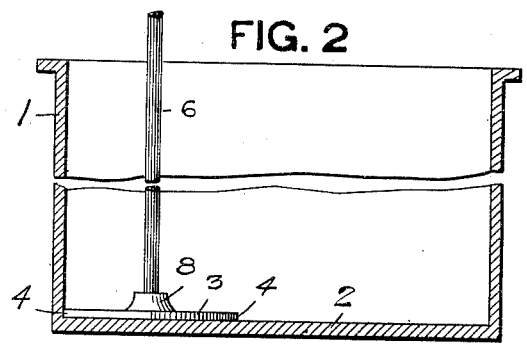
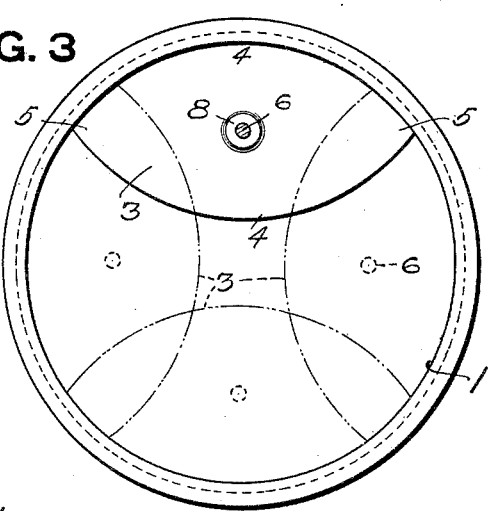
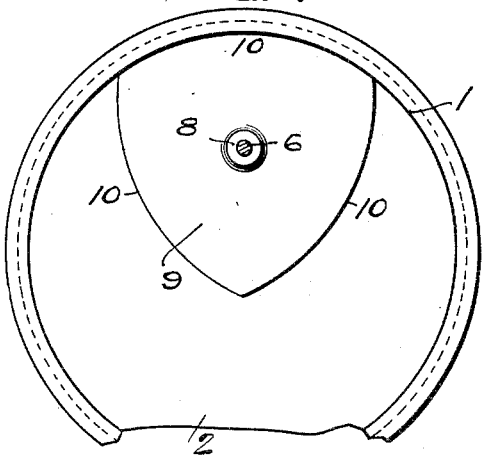
WITNESSES.
J. R. Keller
S. F. Armstrong
INVENTOR.
Albert D. Graham
by Kay Totten & Powell attys

UNITED STATES PATENT OFFICE.

ALBERT D. GRAHAM, OF BRADDOCK, PENNSYLVANIA.

BUTTERIN-MIXER.

1,098,622. Specification of Letters Patent. Patented June 2, 1914.

Application filed August 11, 1913. Serial No. 784,135.

*To all whom it may concern:*

Be it known that I, ALBERT D. GRAHAM, a citizen of the United States, and resident of Braddock, in the county of Allegheny and State of Pennsylvania, have invented a new and useful Improvement in Butterin-Mixers; and I do hereby declare the following to be a full, clear, and exact description thereof.

My invention relates to a mixing device, and is particularly concerned with a device of this character which is adapted primarily, though not exclusively, for the mixing of coloring matter with butterin.

Under the various pure food laws, the selling of butterin colored to imitate butter is prohibited, or in some instances a tax is imposed for so selling. It is customary, therefore, for householders to buy the butterin uncolored, and to color it themselves with some suitable liquid.

This invention has for its object to provide a suitable mixing device by which the householder may readily mix the coloring matter with the butterin effectively and thoroughly the device requiring little skill in its manipulation, and being of simple and economical construction.

With these objects in view the invention consists in the construction and arrangement of parts, a preferred embodiment of which is illustrated in the accompanying drawing, in which—

Figure 1 is a perspective view of the device, the parts being broken away for clear illustration; Fig. 2 is a fragmentary sectional view illustrating one position of the mixing plunger when in operation. Fig. 3 is a diagrammatic plan view of the device showing various operative positions of the plunger, and Fig. 4 is a view similar to Fig. 3, showing a modified form of plunger.

In the embodiment of my invention here illustrated, 1 indicates a mixing jar which may be of glass, or other suitable material, said jar being preferably of cylindrical form, so that the interior is of the same diameter throughout. The bottom 2 of the jar is made preferably flat for the purposes hereinafter described.

The mixing plunger which forms the main subject matter of the invention consists of a plunger blade 3 which in the form shown in Figs. 1 and 2 is of substantially oval form, the sides 4 of the blade being of the same curvature as that of the interior wall of the jar. The ends 5, 5 of the blade may be angular or pointed, as here shown, or may be slightly blunted or curved, if desired. This blade is perfectly flat and is provided with a shank 6 of sufficient length to project a convenient distance above the top of the jar 1, and is provided with a handle 7. This shank may be secured to the blade in any desired manner, but preferably is screwed or fastened within a boss or lug 8 on the upper side of the blade, so that the under side of the blade may be entirely clear or flat to lie flat against the bottom of the jar.

In the effective operation of the device the plunger is thrust down through the mass of butterin in the jar 1 with one of its edges 4 held closely against the wall of the jar. Upon reaching the bottom of the jar, the blade is drawn across horizontally to the opposite side. It is then drawn up said opposite side in close engagement therewith to the top of the mass of butterin. The jar is then given a partial turn, the blade is passed over the top of the mass of butterin and again thrust down in close engagement with the wall. Before or during these operations the coloring fluid is poured into the jar upon the mass of butterin.

From the manner of operating the plunger above described, it results that a portion of the mass of butterin, together with a portion of the coloring fluid is carried down through the mass to the bottom of the jar, and at the same time the side wall engaged by the plunger blade is scraped entirely free of the material. As the blade approaches the bottom of the jar, the butterin is forced out from beneath the same until the blade substantially engages the bottom. In drawing the blade transversely across the bottom of the jar, the bottom is clear of the butterin in the path of the blade, and at the same time the shank of the blade cuts the mass into two parts, then in drawing up the blade against the opposite side of the jar, the suction of the blade removes any of the butterin which may remain between the blade and the jar bottom and carries the same up with the blade, the close engagement of the blade with the sides of the jar at the same time clears said side during the upward drawing of the blade. Thus a rolling action of the mass of butterin takes place, and because the blade closely engages the walls and the bottom of the jar in these movements, these parts are clear of the mass and every part of the mass is subjected to the coloring action of the fluid. The slight turning of the jar after each stroke of the plunger serves further to bring all parts thereof in intimate mixture with the fluid. It will be seen therefore that this device forms a very effective instrument for disseminating the fluid throughout the mass of butterin and also for clearing the sides of the jar. After the coloring matter is thoroughly mixed in, the plunger may be used to press the butterin firmly and compactly down into the jar, and to smooth off the top of the mass.

In the modified form of plunger illustrated in Fig. 4, the blade 9 thereof may be three sided, as shown, each side 10, 10, 10, thereof being of the same curvature as that of the inner wall of the jar. The operation of this plunger is substantially the same as that heretofore described, except that as the plunger is drawn across the bottom of the jar, it may be turned slightly to bring the edge 10 adjacent to that edge and just operated into close contact with the side of the jar.

While I have herein described the particular embodiments of my invention, it is to be understood that the same may be altered in details, as for example, the number of sides of the plunger may be varied, or the relative dimensions of the jar may be altered within the scope of the appended claims.

What I claim is:

1. A mixing device comprising a cylindrical vessel having a flat bottom, in combination with a mixing plunger having a comparatively thin blade having a plurality of edges arranged angularly with respect to each other and a shank, each edge of said blade being of the same curvature as that of the side wall of the jar.

2. A mixing device comprising the combination with a cylindrical vessel having a substantially flat bottom, with a mixing plunger consisting of a comparatively thin blade having a handle shank secured thereto, said blade having two separate side edges relatively angularly arranged each of which is of substantially the same curvature as that of the inner wall of said vessel.

3. A mixing device comprising the combination with a cylindrical mixing jar or vessel, having a substantially flat bottom of a mixing plunger consisting of a comparatively thin blade having two separate edges arranged at an angle to each other, each edge having substantially the same curvature as that of the inner wall of the jar, said blade having a thin handled shank secured thereto, said shank being adapted to act as a cutting blade to divide the mass of material within said jar during the mixing operation.

In testimony whereof I the said ALBERT D. GRAHAM have hereunto set my hand.

ALBERT D. GRAHAM.

Witnesses:
 J. GARFIELD HOUSTON,
 JOHN F. WILL.